United States Patent
Betensky

4,109,995
Aug. 29, 1978

[54] TRIPLET WITH ASPHERIC SURFACES

[75] Inventor: Ellis I. Betensky, Toronto, Canada

[73] Assignee: Opcon Associates of Canada, Ltd., Toronto, Canada

[21] Appl. No.: 692,551

[22] Filed: Jun. 3, 1976

[51] Int. Cl.² .......................... G02B 9/16; G02B 3/02
[52] U.S. Cl. ................................. 350/189; 350/226; 350/209
[58] Field of Search .............. 350/226, 221, 189, 209

[56] References Cited

U.S. PATENT DOCUMENTS

| | | | |
|---|---|---|---|
| 2,031,792 | 2/1936 | Richter | 350/221 |
| 2,623,434 | 12/1952 | Bechtold | 350/226 |
| 3,944,337 | 3/1976 | Ruben | 350/189 |

*Primary Examiner*—Conrad J. Clark
*Attorney, Agent, or Firm*—DeLio and Montgomery

[57] ABSTRACT

A three element lens comprising two outer positive meniscuses and a central negative meniscus with all three elements concave to the aperture stop between the negative meniscus and a positive element.

22 Claims, 6 Drawing Figures

TRIPLET WITH ASPHERIC SURFACES

This invention relates to lenses and more particularly relates to a three-element lens form.

lenses have traditionally been made of glass which requires grinding and polishing of the surfaces. In order to reduce the manufacturing costs of such lenses, designers have chosen lens forms which have a large ratio of surface radius to diameter to permit the grinding of an increased number of lenses at once.

The use of aspheric lens surfaces permits the optical designer greater latitude in designing a lens to given specifications. However, except for special purpose lenses the cost of producing aspherical surfaces on glass is prohibitive. When lens elements are of molded plastic, aspheric surfaces may be advantageously utilized with little if any increase in per unit cost.

Where wide field angle and fast relative aperture of the lens is not critical a three-element lens form known as the Cooke or Taylor triplet is most often utilized by designers. This triplet comprises a bi-convex element, and a bi-concave element followed by a third bi-convex element. This lens form provides many degrees of aberration correction for the designer. In this triplet form of lens the negative element generally has weak curvature to minimize manufacturing cost, and the limiting aberration in this form of lens for design purposes has been astigmatism.

The use of aspheric surfaces, which is generally permitted only in molded plastic lenses, has generally led to modifications of the Cooke or Taylor triplet by making aspheric one or more surfaces thereon as exemplified in U.S. Pat. Nos. 3,784,287, 3,912,379 and 3,944,337. The provision of aspheric surfaces as shown in these patents permits wider relative apertures, but the field angle is still quite limited without introduction of zonal astigmatism.

The present invention provides a new three-element lens of increased field angle with respect to the Cooke triplet, and permits large relative apertures and may include one or more aspheric surfaces.

Briefly stated, a lens embodying the invention comprises a first positive meniscus, a second negative meniscus followed by an aperture and then a third positive meniscus, or vice versa. All elements are concave toward the aperture. The lens may be utilized as described or inverted. Any or all of the surfaces can be made aspheric for increased aperture.

It is an object of this invention to provide a new and improved three-element lens having increased field angle.

Another object of this invention is to provide a new three-element lens using only meniscus elements.

A further object of this invention is to provide a three-element lens which is well corrected for astigmatism, and permits wide relative aperture with increased field angle.

The features of the invention which are believed to be novel are particularly pointed out and distinctly claimed in the concluding portion of this specification. The invention, however, both as to its organization and operation together with further objects and advantages thereof may best be appreciated by reference to the following detailed description taken in conjunction with the drawings, wherein:

Figure 1:
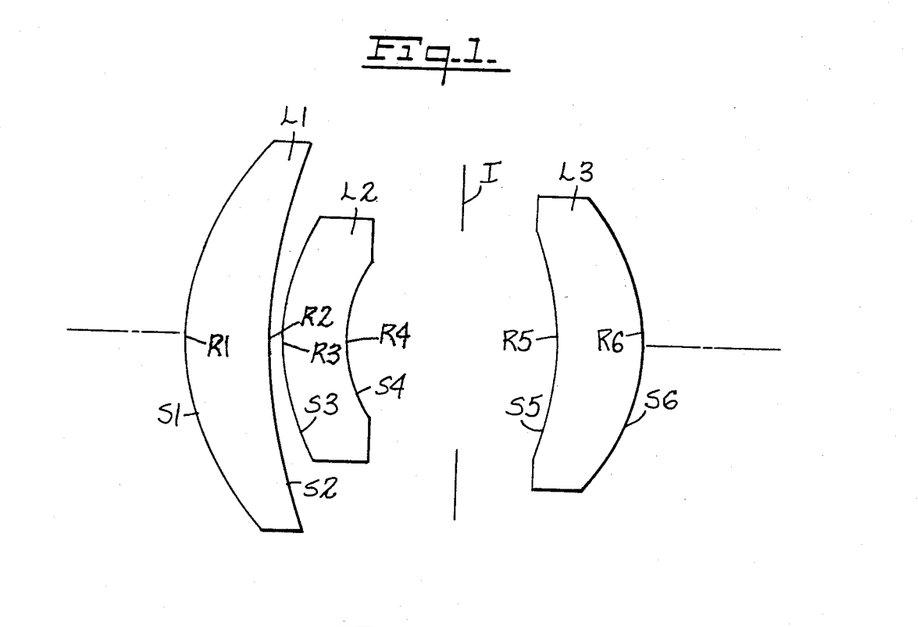
FIG. 1 is a schematic side elevation of a first lens embodying the invention.

As shown in FIG. 1 a lens embodying the invention consists of three elements L1, L2, and L3 with an aperture stop A between the facing concave surface which may or may not be adjustably defined by an iris I.

The elements L1 – L3 have surfaces S1 – S6 defined on radii R1, R2; R3, R4; and R5, R6; respectively.

In the various figures, the lenses are shown with the light originating from the left.

The surfaces of all lenses will hereinafter be defined in terms of curvature C, where $$C = EFL/R$$

and EFL is the focal length of the overall lens, and R is the radius, or base radius at the optical axis if the surface is aspheric.

Two lenses of the form shown in FIG. 1 are defined by prescription in Tables I and II following. In the tables the equivalent focal length (EFL) of each element L1, L2 and L3 is given by $F_1$, $F_2$, and $F_3$, and EFL is given by $F_o$.

In the following tables the index of refraction of the elements is given by $N_d$ and the Abbe number by $V_d$. The back focal length of the lens is indicated by BFL.

A lens as shown in FIG. 1 scaled to an EFL $F_o$ = 23.4 for a semi-field angle of 23°, and a maximum relative aperture of $f/8.0$ is described substantially as follows in Table I.

TABLE I

| Lens | Surface Radius (mm) | Axial Distance Between Surfaces (mm) | $N_D$ | $V_D$ |
|---|---|---|---|---|
| L1 | R1 5.426 | | | |
| | | 1.800 | 1.490 | 57.0 |
| | R2 11.588 | | | |
| | | 0.250 | | |
| | R3 4.629 | | | |
| L2 | | 1.373 | 1.589 | 30.7 |
| | R4 2.663 | | | |
| | | 4.422 | | |
| | R5 −6.971 | | | |
| L3 | | 1.854 | 1.490 | 57.0 |
| | R6 −4.197 | | | |
| | BFL 18.6 | | | |

$F_1$ = 18.960 mm    C1 = 4.31
$F_2$ = −14.349 mm    C2 = 2.02
$F_3$ = 17.605 mm    C3 = 5.06
$F_1/F_o$ = .810    C4 = 8.79
$F_2/F_o$ = −.613    C5 = −3.56
$F_3/F_o$ = .752    C6 = −5.58

A lens as shown in FIG. 1 scaled to an EFL $F_o$ = 25.5mm for a semi-field angle of 22°, and a maximum relative aperture of $f/8.0$ is described substantially as follows in Table II.

TABLE II

| Lens | Surface Radius (mm) | Axial Distance Between Surfaces (mm) | $N_D$ | $V_D$ |
|---|---|---|---|---|
| L1 | R1 5.665 | | | |
| | | 2.092 | 1.490 | 57.0 |
| | R2 11.576 | | | |
| | | 0.143 | | |
| | R3 4.711 | | | |
| L2 | | 1.524 | 1.589 | 30.7 |

TABLE II-continued

| | R4 2.701 | | | |
|---|---|---|---|---|
| | | 4.384 | | |
| | R5 −7.567 | | | |
| L3 | | 2.155 | 14.90 | 57.0 |
| | R6 −4.371 | | | |
| | BFL 18.3 | | | |

$F_1 = 20.24$ mm    $C1 = 4.15$
$F_2 = -14.92''$    $C2 = 2.03$
$F_3 = 17.23''$     $C3 = 4.99$
$F_1/F_0 = .861$    $C4 = 8.71$
$F_2/F_0 = -.634$   $C5 = -3.11$
$F_3/F_0 = .733$    $C6 = -5.38$

Figure 2:
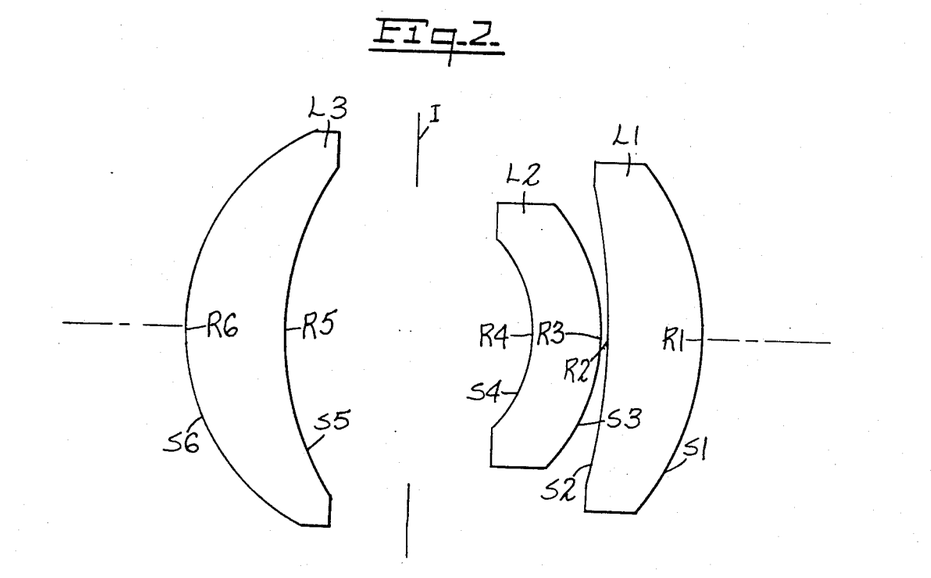
FIG. 2 is a schematic side elevation of another lens which in form is inverse to that of FIG. 1.

FIG. 2 represents a lens which is of a form inverse to that of FIG. 1. For simplicity of disclosure and consistency, the lenses hereinafter inverse to that of FIG. 1 described are labeled with reference characters commencing L1, R1, S1, from the right, with the positive radii being considered as struck on a point to the left.

A lens as shown in FIG. 2 scaled to an $EFL\ F_o = 23.0$mm for a semi-field angle of 22°, and a maximum relative aperture of $f/8.0$ is described substantially as follows in Table III.

TABLE III

| Lens | Surface Radius(mm) | Axial Distance Between Surfaces(mm) | $N_D$ | $V_D$ |
|---|---|---|---|---|
| L1 | R1 5.393 | | | |
| | | 1.899 | 1.490 | 57.0 |
| | R2 12.852 | | | |
| | | 0.124 | | |
| | R3 3.929 | | | |
| L2 | | 1.377 | 1.589 | 30.7 |
| | R4 2.549 | | | |
| | | 5.032 | | |
| | R5 −5.502 | | | |
| L3 | | 1.869 | 1.490 | 57.0 |
| | R6 4.261 | | | |
| | BFL 18.3 | | | |

$F_1 = 17.46$ mm    $C1 = 4.26$
$F_2 = -19.523''$   $C2 = 1.79$
$F_3 = 25.72''$     $C3 = 5.85$
$F_1/F_0 = .76$     $C4 = 9.02$
$F_2/F_0 = -.85$    $C5 = -4.18$
$F_3/F_0 = 1.12$    $C6 = -5.40$

The lens designs shown in FIGS. 1 and 2 may have one or more surfaces made aspheric to provide a greater relative aperture. When aspheric, the lens surface in diametrical half section is defined by $$X - \tfrac{1}{2} C(K+1)X^2 - \tfrac{1}{2} CY^2 + G^{C^3/2} Y^4 = 0$$

where $X$ is the abscissa along the optical axis
$Y$ is the ordinate
$C$ is the curvature at the optical axis and equals $F_o/R$.
$R$ is the radius at the optical axis
$K$ is a conic constant
$G$ is a higher order constant and equal to zero if the surface is a conic section of rotation.

This above equation defines a conic section of rotation made by rotation of a section of a cone taken transverse to the axis of the cone. Otherwise stated, the quantity X is the sag of the surface from a reference plane at an ordinate or semi-aperture distance Y from the optical axis. The equation may include other higher order terms ($HY^6$, $KY^8$) if desired.

Figure 3:
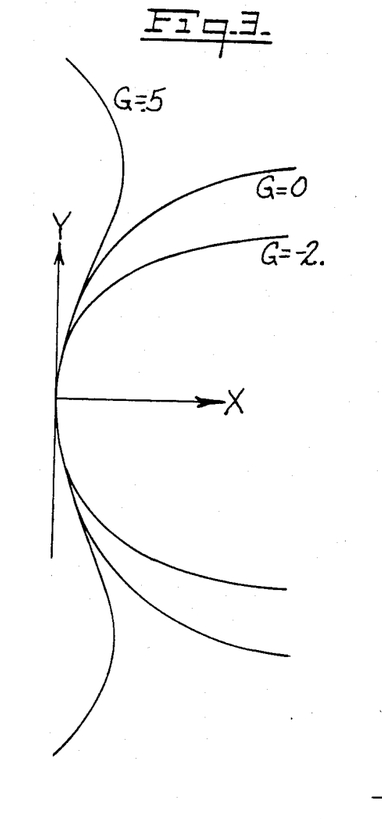
FIG. 3 is a diagram of the shape of surfaces which may be presented for lenses embodying the invention.

FIG. 3 exemplifies surface curvatures that may be generated for different values of G.

Various values of K will produce surface sections as follows:

| $K = 0$ | Spherical |
|---|---|
| $K = -1$ | Parabolic |
| $K = 0$ to $-1$ | Ellipse where smaller axis is vertical |
| $K = $ positive | Ellipse when smaller axis is horizontal |
| $K = > -1$ | Hyperbola |

Figure 4:
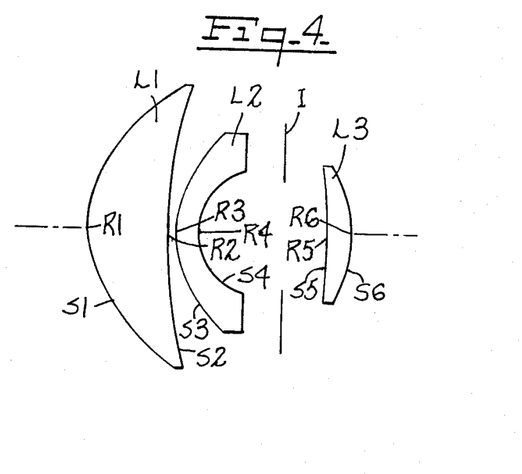
FIG. 4 is a schematic side elevation of a lens embodying the invention with at least one aspheric surface.

A three-element photographic lens of the type described having one or more aspheric surfaces is shown in FIG. 4 comprising elements L1, L2, and L3, having surfaces S1 − S6, defined on radii R1 − R6, at least at the optical axis, Tables IV − VI define such lenses.

A lens as shown in FIG. 4 scaled to an $EFL\ F_o = 23.0$mm for a semi-field angle of 30°, and a maximum relative aperture of $f/4.0$ is described substantially as follows in Table IV.

TABLE IV

| Lens | Surface Radius (mm) | Axial Distance Between Surfaces (mm) | $N_D$ | $V_D$ |
|---|---|---|---|---|
| L1 | R1 5.355 | | | |
| | | 3.610 | 1.490 | 57.1 |
| | R2 16.291 | | | |
| | | 0.120 | | |
| | R3 4.568 | | | |
| L2 | | 0.726 | 1.589 | 30.8 |
| | R4 2.401 | | | |
| | | 5.412 | | |
| | R5 −9.289 | | | |
| L3 | | 1.160 | 1.490 | 57.1 |
| | R6 −4.342 | | | |
| | BFL 17.0 | | | |

| Aspheric Surfaces | K | G |
|---|---|---|
| S1 | −0.4175 | 0.04557 |
| S3 | 0.2313 | −0.01841 |
| S4 | −0.1513 | −0.01787 |

$F_1 = 14.65$mm     $C1 = 4.295$
$F_2 = -9.775''$    $C2 = 1.412$
$F_3 = 15.41''$     $C3 = 5.035$
$F_1/F_0 = .637$    $C4 = 9.579$
$F_2/F_0 = -.425$   $C5 = -2.476$
$F_3/F_0 = .67$     $C6 = -5.297$

A lens as shown in FIG. 4 scaled to an $EFL\ F_o = 100$mm for a semi-field angle of 22°, and a maximum relative aperture of $f/4.0$ is described substantially as follows in Table V.

TABLE V

| Lens | Surface Radius (mm) | Axial Distance Between Surfaces (mm) | $N_D$ | $V_D$ |
|---|---|---|---|---|
| L1 | R1 23.809 | | | |
| | | 15.667 | 1.490 | 57.1 |
| | R2 84.818 | | | |
| | | .521 | | |
| | R3 20.568 | | | |
| L2 | | 3.151 | 1.589 | 30.8 |
| | R4 10.663 | | | |
| | | 23.375 | | |
| | R5 −38.565 | | | |
| L3 | | 5.034 | 1.490 | 57.1 |
| | R6 −18.741 | | | |
| | BFL 73.8 | | | |

| Apheric Surfaces | K | G |
|---|---|---|
| S1 | −0.4227 | 0.0361 |
| S3 | 0.1626 | −0.00688 |
| S4 | −0.1586 | −0.0152 |

$F_1 = 62.14$ mm    $C1 = 4.200$
$F_2 = -42.56''$    $C2 = 1.179$
$F_3 = 68.53''$     $C3 = 4.862$
$F_1/F_0 = .6214$   $C4 = 9.378$
$F_2/F_0 = -4.256$  $C5 = -2.593$
$F_3/F_0 = .6853$   $C6 = -5.336$

A lens as shown in FIG. 4 scaled to an $EFL\ F_o = 50.1mm$ for a semi-field angle of 20°, and a maximum relative aperture of $f/3.5$ is described substantially as follows in Table VI.

TABLE VI

| Lens | Surface Radius (mm) | Axial Distance Between Surfaces (mm) | $N_D$ | $V_D$ |
|---|---|---|---|---|
| L1 | R1 10.338 | | | |
| | | 5.042 | 1.490 | 57.9 |
| | R2 39.274 | | | |
| | | 0.250 | | |
| L2 | R3 10.048 | | | |
| | | 1.500 | 1.590 | 30.7 |
| | R4 5.640 | | | |
| | | 15.465 | | |
| L3 | R5 −20.773 | | | |
| | | 2.673 | 1.490 | 57.9 |
| | R6 −11.551 | | | |

BFL 32.43mm

| Aspheric Surfaces | K | G |
|---|---|---|
| S1 | −0.621 | 0 |
| S4 | −0.322 | 0 |

$F_1 = 26.99mm$    $C1 = 4.84$
$F_2 = −24.94mm$    $C2 = 1.27$
$F_3 = 48.37mm$    $C3 = 4.98$
$F_1/F_0 = .539$    $C4 = 8.88$
$F_2/F_0 = −.498$    $C5 = −2.41$
$F_3/F_0 = .966$    $C6 = −4.33$ A lens as shown in FIG. 4 scaled to an $EFL\ F_o = 50mm$ for a semi-field angle of 20°, and a maximum relative aperture of $f/3.5$ is described substantially as follows in Table VII.

TABLE VII

| Lens | Surface Radius (mm) | Axial Distance Between Surfaces (mm) | $N_D$ | $V_D$ |
|---|---|---|---|---|
| L1 | R1 10.910 | | | |
| | | 5.462 | 1.490 | 57.9 |
| | R2 39.480 | | | |
| | | .250 | | |
| L2 | R3 9.995 | | | |
| | | 1.50 | 1.590 | 30.7 |
| | R4 5.648 | | | |
| | | 15.501 | | |
| L3 | R5 −23.139 | | | |
| | | 2.391 | 1.490 | 57.9 |
| | R6 −11.564 | | | |

BFL 34.0

| Apheric Surfaces | K | G |
|---|---|---|
| S1 | −0.6350 | 0 |
| S4 | −0.3220 | 0 |

Figure 5:
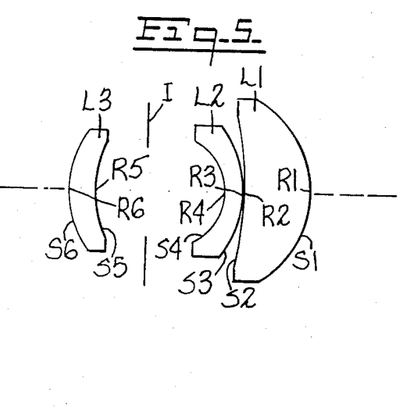
FIG. 5 is a schematic side elevation of a lens which is the inverse of the lens of FIG. 4.

$F_1 = 28.95$    $C1 = 4.58$
$F_2 = −29.90$    $C2 = 1.27$
$F_3 = 44.18$    $C3 = 5.00$
$F_1/F_0 = .579$    $C4 = 8.85$
$F_2/F_0 = −.598$    $C5 = 2.16$
$F_3/F_0 = .884$    $C6 = 4.32$ The lens may be inverted from the form of FIG. 4 to the form of FIG. 5. Examples of such lenses are set forth in Tables VIII – XI.

In the lenses of Tables VII – X the first element L1 is to the right and positive radii are struck from the left.

A lens as shown in FIG. 5 scaled to an $EFL\ F_o = 23.0mm$ for a semi-field angle of 22°, and a maximum relative aperture of $f/8.0$ is described substantially as follows in Table VIII.

TABLE VIII

| Lens | Surface Radius (mm) | Axial Distance Between Surfaces(mm) | $N_D$ | $V_D$ |
|---|---|---|---|---|
| L1 | R1 4.159 | | | |
| | | 2.809 | 1.490 | 47.0 |
| | R2 12.374 | | | |
| | | .124 | | |
| L2 | R3 4.747 | | | |
| | | .749 | 1.589 | 30.7 |
| | R4 2.435 | | | |
| | | 5.425 | | |
| L3 | R5 −5.834 | | | |
| | | 1.188 | 1.490 | 57.0 |
| | R6 −3.991 | | | |

BFL 18.3

| Aspheric Surfaces | K | G |
|---|---|---|
| S1 | −0.2392 | 0 |

$F_1 = 11.45\ mm$    $C1 = 5.53$
$F_2 = −9.63\ "$    $C2 = 1.86$
$F_3 = 21.22\ "$    $C3 = 4.85$
$F_1/F_0 = .50$    $C4 = 9.45$
$F_2/F_0 = −.42$    $C5 = −3.94$
$F_3/F_0 = .922$    $C6 = −5.76$ A lens as shown in FIG. 5 scaled to an $EFL\ F_o = 20.0mm$ for a semi-field angle of 20° and a maximum relative aperture of $f/3.7$ is described substantially as follows in Table IX.

TABLE IX

| Lens | Surface Radius (mm) | Axial Distance Between Surfaces (mm) | $N_D$ | $V_D$ |
|---|---|---|---|---|
| L1 | R1 3.509 | | | |
| | | 2.400 | 1.490 | 57.9 |
| | R2 24.623 | | | |
| | | 0 | | |
| L2 | R3 3.976 | | | |
| | | .916 | 1.588 | 30.6 |
| | R4 2.201 | | | |
| | | 8.393 | | |
| L3 | R5 −7.292 | | | |
| | | .851 | 1.490 | 57.9 |
| | R6 −5.243 | | | |

BFL 16.4

| Aspheric Surfaces | K | G |
|---|---|---|
| S1 | −.8897 | 0 |
| S4 | −.4404 | 0 |

$F_1 = 8.03mm$    $C1 = 5.70$
$F_2 = −8.73$    $C2 = .812$
$F_3 = 33.42$    $C3 = 5.03$
$F_1/F_0 = .40$    $C4 = 9.07$
$F_2/F_0 = 0\ −.44$    $C5 = −2.74$
$F_3/F_0 = 1.67$    $C6 = −3.81$ A lens as shown in FIG. 5 scaled to an $EFL\ F_o = 20.0mm$ for a semi-field angle of 20°, and a maximum relative aperture of $f/3.7$ is described substantially as follows in Table X.

TABLE X

| Lens | Surface Radius (mm) | Axial Distance Between Surfaces (mm) | $N_D$ | $V_D$ |
|---|---|---|---|---|
| L1 | R1 3.794 | | | |
| | | 1.106 | 1.613 | 58.6 |
| | R2 20.140 | | | |
| | | 0 | | |
| L2 | R3 4.432 | | | |
| | | .196 | 1.648 | 33.9 |
| | R4 2.407 | | | |
| | | 3.260 | | |
| L3 | R5 −6.312 | | | |
| | | .851 | 1.613 | 58.6 |
| | R6 −5.29 | | | |

BFL 19.0

| Aspheric Surfaces | K | G |
|---|---|---|
| S1 | .7515 | 0 |
| S4 | −.5595 | 0 |
| S6 | −1.5242 | 0 |

$F_1 = 7.435$    $C1 = 5.27$
$F_2 = −8.451$    $C2 = 3.17$
$F_3 = 40.50$    $C3 = 4.51$
$F_1/F_0 = .371$    $C4 = 8.31$
$F_2/F_0 = −.423$    $C5 = −3.17$

TABLE X-continued

| | |
|---|---|
| $F_3/F_0 = 2.025$ | $C6 = -3.78$ |

A lens as shown in FIG. 5 scaled to an EFL $F_o = 20.0$mm for a semi-field angle of 20°, and a maximum relative aperture of f/3.7 is described substantially as follows in Table XI.

TABLE XI

| Lens | Surface Radius (mm) | Axial Distance Between Surfaces (mm) | $N_D$ | $V_D$ |
|---|---|---|---|---|
| L1 | R1 3.326 | | | |
| | | 2.400 | 1.490 | 57.9 |
| | R2 25.211 | | | |
| | | 0 | | |
| L2 | R3 3.314 | | | |
| | | .196 | 1.588 | 30.6 |
| | R4 1.905 | | | |
| | | 8.752 | | |
| L3 | R5 −6.793 | | | |
| | | .851 | 1.490 | 57.9 |
| | R6 −5.160 | | | |

BFL 17.2

| Aspheric Surfaces | K | G |
|---|---|---|
| S1 | 1.0895 | 0 |
| S3 | −.2499 | 0 |
| S4 | −.5736 | 0 |

| | |
|---|---|
| $F_1 = 7.53$mm | $C1 = 6.03$ |
| $F_2 = -8.02''$ | $C2 = .793$ |
| $F_3 = 37.32''$ | $C3 = 6.04$ |
| $F_1/F_0 = .377$ | $C4 = 10.50$ |
| $F_2/F_0 = -.401$ | $C5 = -2.94$ |
| $F_3/F_0 = 1.87$ | $C6 = -3.88$ |

A lens in accordance with the invention may be used in either the form shown in FIGS. 1 and 4, or in the inverted form of FIGS. 2 and 5, for either taking or projection.

Figure 6:
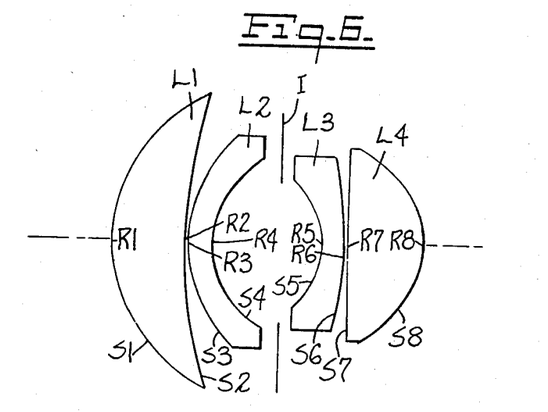
FIG. 6 is a schematic side elevation of another lens embodying the invention.

Surfaces S4, S5 and S8 are aspheric. The aperture stop defining member A is disposed between elements L2 and L3, as previously disclosed. This lens, with the addition of L4 may be designed with a relative aperture of f/2.8. The third L3 element adds more negative power to the lens and gives a better tool for color correction.

From the foregoing examples it may be seen that the value of the ratio of the Abbe values of the positive lens to that of the negative lens is always greater than 1.8 or $$(V_+/V_-) > 1.8$$

This permits the lens to be achromatized. Any of the surfaces can be made aspheric for increased relative aperture. The lens is basically well corrected for astigmatism, the one limiting aberration of the Cooke triplet.

The distance D4 between the facing concave surfaces of elements L2 and L3 is $$0.10F_o \leq D_4 \leq 0.50F_o$$

where $F_o$ is the EFL of the overall lens.

Additionally, the distance $D_2$ between elements L1 and L2 in the range is $$0 \leq D_2 \leq 0.2F_o$$

The EFL's of the elements bear the following relation:

$$0.35F_o \leq F_1 \leq 1.0F_o$$

$$0.35F_o \leq |F_2| \leq 1.0F_o$$

$$0.50 \leq F_3 \leq 2.0F_o$$

$$F_o > F_1$$

$$F_o > |F_2|$$

The curvatures of the lens surfaces are:

$$C1 \geq 4.0$$

$$C1 \geq C2 \geq 0.7$$

$$C4 > C3 \geq 4.5$$

$$C3 < C4 \geq 8.0$$

$$|C5| \geq 2.0$$

$$|C6| \geq 3.5$$

The elements having aspheric surfaces are preferably molded of a suitable plastic such as polymethyl methacrylate, polycyclohexyl methacrylate, polystyrene or acrylonitrile. The elements not having aspheric surfaces may be glass or plastic.

As will be seen from the examples set forth, one or more of any and all of the lenses may be made aspheric. In all cases a semi-field angle of at least 20° is achieved.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A lens consisting of first, second and third elements, said first and third elements being meniscuses of positive power with facing concave surfaces, said second element being a meniscus of negative power between said first and third elements, an aperture defining means between the concave surface of said second element and the concave surface of one of said other elements, the elements commencing with the positive element removed from the aperture defining means have equivalent focal lengths F1, F2 and F3, and:

$$F_o > F_1$$

$$F_o > |F_2|$$

$$0.5F_o \leq F_3 \leq 2.1F_o$$

where $F_o$ is the equivalent focal length of the overall lens.

2. The lens of claim 1 having surface curvatures C1–C6 successively from the element separated from the aperture by the negative element where $C = F/R$, F is the equivalent focal length of the lens, R is the surface radius of the element at the optical axis, and $$7.0 > C1 > 4.0$$

$$11.0 < C4 > 8.0$$

3. The lens of claim 2 where $7.0 > C3 > 4.5$ $4.5 > C5 > 2.0$ $6.0 > C6 > 3.5$ $C6 > |C5|$ 4. The lens of claim 1 where the Abbe number of the positive elements is at least 1.8 times the Abbe number of the negative element.

5. The lens of claim 1 wherein the distance $D_2$ between the convex side of the negative element and the adjacent positive element is:

$0 \leq D_2 < 0.02 F_o$ where $F_o$ is the equivalent focal length of the lens.

6. The lens of claim 1 wherein the distance $D_4$ on the optical axis between the facing concave surfaces on either side of the means defining the aperture is:

$0.1 F_o < D_4 < 0.5 F_o$.

7. The lens of claim 1 having surface curvatures C1–C6 successively from the element separated from the aperture by the negative element, where $C = F/R$, $F$ is the focal length of the lens, $R$ is the surface radius of the element at the optical axis, and $7.0 > C1 > 4$ $3.2 > C2 > 0.7$ $7.0 > C3 > 4.5$ $11.0 > C4 > 8.0$ $4.5 > C5 > 2.0$ $6.0 > C6 > 3.5$.

8. The lens of claim 1 defined substantially as follows:

| Lens | Surface | Axial Between Surfaces/EFL | $N_d$ | $V_d$ |
|---|---|---|---|---|
| L1 | C1 4.31 | | | |
| | | .077 | 1.490 | 57.0 |
| | C2 2.02 | | | |
| | | .011 | | |
| | C3 5.06 | | | |
| L2 | | .059 | 1.589 | 30.7 |
| | C4 8.79 | | | |
| | | 0.189 | | |
| | C5 −3.56 | | | |
| L3 | | .080 | 1.490 | 57.0 |
| | C6 −5.58 | | | | where EFL is the equivalent focal length of the lens; L1–L3 are successive elements with L1 furtherest removed from the aperture, C1–C6 are successive surface curvatures of element L1–L3 where the curvature is the EFL of the lens divided by radius of the surface at the optical axis; $N_d$ is the index of refraction and $V_d$ is the Abbe number of the elements.

9. The lens of claim 1 defined substantially as follows:

| Lens | Surface | Axial Between Surfaces/EFL | $N_d$ | $V_d$ |
|---|---|---|---|---|
| L1 | C1 4.15 | | | |
| | | .082 | 1.490 | 57.0 |
| | C2 2.03 | | | |
| | | .006 | | |
| | C3 4.99 | | | |
| L2 | | .060 | 1.589 | 30.7 |
| | C4 8.71 | | | |
| | | 0.172 | | |
| | C5 −3.11 | | | |
| L3 | | .085 | 14.90 | 57.0 |
| | C6 −5.38 | | | | where EFL is the equivalent focal length of the lens; L1–L3 are successive elements with L1 furtherest removed from the aperture, C1–C6 are successive surface curvatures of element L1–L3 where the curvature is the EFL of the lens divided by radius of the surface at the optical axis; $N_d$ is the index of refraction and $V_d$ is the Abbe number of the elements.

10. The lens of claim 1 defined substantially as follows:

| Lens | Surface | Axial Between Surfaces/EFL | $N_d$ | $V_d$ |
|---|---|---|---|---|
| L1 | C1 4.26 | | | |
| | | .083 | 1.490 | 57.0 |
| | C2 1.79 | | | |
| | | .005 | | |
| | C3 5.85 | | | |
| L2 | | .060 | 1.589 | 30.7 |
| | C4 9.02 | | | |
| | | .219 | | |
| | C5 −4.18 | | | |
| L3 | | .081 | 1.490 | 57.0 |
| | C6 −5.40 | | | | where EFL is the equivalent focal length of the lens; L1–L3 are successive elements with L1 furtherest removed from the aperture, C1–C6 are successive surface curvatures of element L1–L3 where the curvature is the EFL of the lens divided by radius of the surface at the optical axis; $N_d$ is the index of refraction and $V_d$ is the Abbe number of the elements.

11. The lens of claim 1 wherein at least a surface of one element is made aspheric and defined by:

$$X - \tfrac{1}{2}C(K+1)X^2 - \tfrac{1}{2}CY^2 + G C^{3/2} Y^4 = 0$$

where $X$ is the sag of the surface from a reference plane at a semi-aperture distance $Y$ from the optical axis; $C$ is the curvature of the lens at the optical axis and equal to the equivalent focal length of the lens divided by the radius of curvature at the optical axis; $K$ is a conic constant; and $G$ is a constant coefficient of higher order aspheric sag of the surface and said elements have successive surfaces S1–S6 commencing with the positive element removed from the aperture defining means.

12. The lens of claim 11 wherein the convex surface of the element removed from the aperture defining means is aspheric.

13. The lens of claim 12 where $0 > K > -1$.

14. The lens of claim 11 wherein both surfaces S3 and S4 of the negative element are aspheric.

15. The lens of claim 11 defined substantially as follows:

| Lens | Surface | Axial Between Surfaces/EFL | $N_d$ | $V_d$ |
|---|---|---|---|---|
| L1 | C1 4.295 | | | |
| | | .157 | 1.490 | 57.1 |
| | C2 1.412 | | | |
| | | .011 | | |
| | C3 5.035 | | | |
| L2 | | .031 | 1.589 | 30.8 |
| | C4 9.579 | | | |
| | | .235 | | |
| | C5 −2.476 | | | |
| L3 | | .050 | 1.490 | 57.1 |
| | C6 −5.297 | | | |
| Aspheric Surfaces | | K | G | |
| | S1 | −0.4175 | 0.04557 | |
| | S3 | 0.2313 | −0.01841 | |
| | S4 | −0.1513 | −0.01787 | | where EFL is the equivalent focal length of the lens; L1-L3 are successive elements with L1 furtherest removed from the aperture, C1-C6 are successive surface curvatures of elements L1-L3 at the optical axis where the curvature is the EFL of the lens divided by radius of the surface at the optical axis; and $N_d$ is the index of refraction and $V_d$ is the Abbe number of the elements.

16. The lens of claim 11 defined substantially as follows:

| Lens | Surface | Axial Between Surfaces/EFL | $N_d$ | $V_d$ |
|---|---|---|---|---|
| L1 | C1 4.200 | | | |
| | | .157 | 1.490 | 57.1 |
| | C2 1.179 | | | |
| | | .005 | | |
| | C3 4.862 | | | |
| L2 | | .031 | 1.589 | 30.8 |
| | C4 9.378 | | | |
| | | .234 | | |
| | C5 −2.593 | | | |
| L3 | | .050 | 1.490 | 57.1 |
| | C6 −5.336 | | | |
| Aspheric Surfaces | | K | G | |
| | S1 | −0.4227 | 0.0361 | |
| | S3 | 0.1626 | −0.00688 | |
| | S4 | −0.1586 | −0.0152 | | where EFL is the equivalent focal length of the lens; L1-L3 are successive elements with L1 furtherest removed from the aperture, C1-C6 are successive surface curvatures of elements L1-L3 at the optical axis where the curvature is the EFL of the lens divided by radius of the surface at the optical axis; and $N_d$ is the index of refraction and $V_d$ is the Abbe number of the elements.

17. The lens of claim 11 defined substantially as follows;

| Lens | Surface | Axial Between Surfaces/EFL | $N_d$ | $V_d$ |
|---|---|---|---|---|
| L1 | C1 4.84 | | | |
| | | .101 | 1.490 | 57.9 |
| | C2 1.27 | | | |
| | | .005 | | |
| | C3 .498 | | | |
| L2 | | .030 | 1.590 | 30.7 |
| | C4 8.88 | | | |
| | | .309 | | |
| | C5 −2.41 | | | |
| L3 | | .053 | 1.490 | 57.9 |
| | C6 −4.33 | | | |
| Aspheric Surfaces | | K | G | |
| | S1 | −0.621 | 0 | |
| | S4 | −0.322 | 0 | | where EFL is the equivalent focal length of the lens; L1-L3 are successive elements with L1 furtherest removed from the aperture, C1-C6 are successive surface curvatures of elements L1-L3 at the optical axis where the curvature is the EFL of the lens divided by radius of the surface at the optical axis; and $N_d$ is the index of refraction and $V_d$ is the Abbe number of the elements.

18. The lens of claim 11 defined substantially as follows:

| Lens | Surface | Axial Between Surfaces/EFL | $N_d$ | $V_d$ |
|---|---|---|---|---|
| L1 | C1 4.58 | | | |
| | | .109 | 1.490 | 57.9 |
| | C2 1.27 | | | |
| | | .005 | | |
| | C3 5.00 | | | |
| L2 | | .030 | 1.590 | 30.7 |
| | C4 8.85 | | | |
| | | .310 | | |
| | C5 −2.16 | | | |
| L3 | | .048 | 1.490 | 57.9 |
| | C6 −4.32 | | | |
| Aspheric Surfaces | | K | G | |
| | S1 | −0.6350 | 0 | |
| | S4 | −0.3220 | 0 | | where EFL is the equivalent focal length of the lens; L1-L3 are successive elements with L1 furtherest removed from the aperture, C1-C6 are successive surface curvatures of elements L1-L3 at the optical axis where the curvature is the EFL of the lens divided by radius of the surface at the optical axis; and $N_d$ is the index of refraction and $V_d$ is the Abbe number of the elements.

19. The lens of claim 11 defined substantially as follows:

| Lens | Surface | Axial Between Surfaces/EFL | $N_d$ | $V_d$ |
|---|---|---|---|---|
| L1 | C1 5.53 | | | |
| | | .122 | 1.490 | 47.0 |
| | C2 1.86 | | | |
| | | .005 | | |
| | C3 4.85 | | | |
| L2 | | .032 | 1.589 | 30.7 |
| | C4 9.45 | | | |
| | | .236 | | |
| | C5 −3.94 | | | |
| L3 | | .052 | 1.490 | 57.0 |
| | C6 −5.76 | | | |
| Aspheric Surfaces | | K | G | |
| | S1 | −0.2392 | 0 | | where EFL is the equivalent focal length of the lens; L1-L3 are successive elements with L1 furtherest removed from the aperture, C1-C6 are successive surface curvatures of elements L1-L3 at the optical axis where the curvature is the EFL of the lens divided by radius of the surface at the optical axis; and $N_d$ is the index of refraction and $V_d$ is the Abbe number of the elements.

20. The lens of claim 11 defined substantially as follows:

| Lens | Surface | Axial Between Surfaces/EFL | $N_d$ | $V_d$ |
|---|---|---|---|---|
| L1 | C1 5.70 | | | |
| | | .120 | 1.490 | 57.9 |
| | C2 .812 | | | |
| | | 0 | | |
| | C3 5.03 | | | |
| L2 | | .010 | 1.588 | 30.6 |
| | C4 9.07 | | | |
| | | .420 | | |

-continued

| Lens | Surface | Axial Between Surfaces/EFL | $N_d$ | $V_d$ |
|---|---|---|---|---|
| L3 | C5 −2.74 | .043 | 1.490 | 57.9 |
|  | C6 −3.81 |  |  |  |

| Aspheric Surfaces | K | G |
|---|---|---|
| S1 | −.8897 | 0 |
| S4 | −.4404 | 0 | where EFL is the equivalent focal length of the lens; L1-L3 are successive elements with L1 furtherest removed from the aperture, C1-C6 are successive surface curvatures of elements L1-L3 at the optical axis where the curvature is the EFL of the lens divided by radius of the surface at the optical axis; and $N_d$ is the index of refraction and $V_d$ is the Abbe number of the elements.

21. The lens of claim 11 defined substantially as follows:

| Lens | Surface | Axial Between Surfaces/EFL | $N_d$ | $V_d$ |
|---|---|---|---|---|
| L1 | C1 5.27 | .055 | 1.613 | 58.6 |
|  | C2 3.17 |  |  |  |
|  |  | 0 |  |  |
| L2 | C3 4.51 | .010 | 1.648 | 33.9 |
|  | C4 8.31 |  |  |  |
|  |  | .163 |  |  |
| L3 | C5 −3.17 | .043 | 1.613 | 58.6 |
|  | C6 −3.78 |  |  |  |

| Aspheric Surfaces | K | G |
|---|---|---|
| S1 | .7515 | 0 |
| S4 | −.5595 | 0 |

-continued

| | S6 | −1.5242 | 0 |
|---|---|---|---| where EFL is the equivalent focal length of the lens; L1-L3 are successive elements with L1 furtherest removed from the aperture, C1-C6 are successive surface curvatures of elements L1-L3 at the optical axis where the curvature is the EFL of the lens divided by radius of the surface at the optical axis; and $N_d$ is the index of refraction and $V_d$ is the Abbe number of the elements.

22. The lens of claim 11 defined substantially as follows:

| Lens | Surface | Axial Between Surfaces/EFL | $N_d$ | $V_d$ |
|---|---|---|---|---|
| L1 | C1 6.03 | .120 | 1.490 | 57.9 |
|  | C2 .793 |  |  |  |
|  |  | 0 |  |  |
| L2 | C3 6.04 | .010 | 1.588 | 30.6 |
|  | C4 10.50 |  |  |  |
|  |  | .438 |  |  |
| L3 | C5 −2.94 | .043 | 1.490 | 57.9 |
|  | C6 −3.88 |  |  |  |

| Aspheric Surfaces | K | G |
|---|---|---|
| S1 | 1.0895 | 0 |
| S3 | −.2499 | 0 |
| S4 | .5736 | 0 | where EFL is the equivalent focal length of the lens; L1-L3 are successive elements with L1 furtherest removed from the aperture, C1-C6 are successive surface curvatures of elements L1-L3 at the optical axis where the curvature is the EFL of the lens divided by radius of the surface at the optical axis; and $N_d$ is the index of refraction and $V_d$ is the Abbe number of the elements.

* * * * *

UNITED STATES PATENT AND TRADEMARK OFFICE
CERTIFICATE OF CORRECTION

PATENT NO. : 4,109,995
DATED : August 29, 1978
INVENTOR(S) : ELLIS I. BETENSKY

It is certified that error appears in the above-identified patent and that said Letters Patent are hereby corrected as shown below:

In the Drawings, delete Fig. 6.

Column 2, delete lines 9 and 10.

Column 3, Table III, under the heading "Surface Radius (mm)", "4.261" should read -- -4.261--.

Column 3, line 48, the equation should read as follows:

$$X - 1/2C(K+1)X^2 - 1/2CY^2 + G\frac{C^3}{2}Y^4 = 0$$

Column 4, Table IV, under the heading "Aspheric Surfaces", ".67" should read -- -.67--.

Column 6, Table IX, under the heading "Aspheric Surfaces", "$F_2/F_0 = 0$ -.44" should read -- $F_2/F_0 = -.44$ --.

Column 7, Table XI, under "K", "-.2499" should read -- -.2449--.

Column 7, delete lines 36-42, "Surfaces S4 ... correction."

Column 10, line 47, the equation should read as follows:

$$X - 1/2C(K+1)X^2 - 1/2CY^2 + G\frac{C^3}{2}Y^4 = 0$$

UNITED STATES PATENT AND TRADEMARK OFFICE
CERTIFICATE OF CORRECTION

PATENT NO. : 4,109,995
DATED : August 29, 1978
INVENTOR(S) : ELLIS I. BETENSKY

It is certified that error appears in the above-identified patent and that said Letters Patent are hereby corrected as shown below:

Column 11, claim 17, "follows;" should read --follows:--.

Column 12, claim 19, under the heading "Surface", after "C1", insert --5.53--.

Column 12, claim 19, under the heading "Axial Between Surfaces/EFL", delete "5.53".

Column 14, claim 22, under "K", "-.2499" should read -- -.2449--.

Signed and Sealed this

Fifteenth Day of May 1979

[SEAL]

Attest:

RUTH C. MASON
Attesting Officer

DONALD W. BANNER
Commissioner of Patents and Trademarks